United States Patent [19]

Turpin

[11] 4,221,647

[45] Sep. 9, 1980

[54] ANODIC ELECTROCOATING COMPOSITIONS

[75] Inventor: Edward T. Turpin, Elyria, Ohio

[73] Assignee: SCM Corporation, New York, N.Y.

[21] Appl. No.: 49,802

[22] Filed: Jun. 18, 1979

[51] Int. Cl.$^2$ ............................................. C25D 13/06
[52] U.S. Cl. ............................................... 204/181 R
[58] Field of Search .................................. 204/181 R

[56] References Cited

U.S. PATENT DOCUMENTS 3,650,998  3/1972  Sekmakas et al. ............... 204/181 R
3,663,401  5/1972  Christenson et al. ............. 204/181 R

*Primary Examiner*—Howard S. Williams
*Attorney, Agent, or Firm*—Thomas M. Schmitz

[57] ABSTRACT

An electrocoating composition useful for electrocoating a paint coating from an aqueous solution onto an anode electrical conductive substrate. The electrocoating composition is based upon a fatty acid ester and $\alpha,\beta$-unsaturated dicarboxylic acid modified styrene-allyl alcohol copolymer further modified with an acid-functional acrylic copolymer. The electrocoated film can be air dried or heat cured.

1 Claim, No Drawings

ANODIC ELECTROCOATING COMPOSITIONS

BACKGROUND OF THE INVENTION

Electrocoating compositions are well known and disclosed in Gilchrist patents, U.S. Pat. Nos. 3,351,675; 3,362,899; 3,575,909; and 3,351,575 and the same are incorporated herein by reference. Electrocoating compositions are dispersed in dilute water baths and then electrocoated onto cathodic or anodic substrates submerged in the electrocoating bath. The electrocoated films can be heat cured with catalysts or cured by ultraviolet energy as disclosed in U.S. Pat. No. 4,040,925.

It now has been found that particularly useful anodic electrocoating compositions based on a fatty acid and unsaturated acid modified styrene-allyl alcohol polymers, further modified with acid functional acrylic copolymers, provide excellent electrocoating compositions for anode substrates. The electrocoating compositions exhibit high hydrophobic properties which impart excellent plating properties such as shut down, throwing power, as well as excellent cured film properties such as good water resistance and salt spray resistance. The electrocoating composition polymer is substantially free of readily hydrolysable ester groups in addition to contributing considerably to good electrical resistance properties and bath stability. The electrocoating compositions are particularly well suited to air-drying or force-drying wherein good post flow is obtainable. The electrocoated film quickly dries to handle or stack if desired. Baking at higher temperatures may also be used to cure the coating in which case an aminoplast curing agent may be advantageously employed. These and other advantages are achieved by the electrocoating composition of this invention.

SUMMARY OF THE INVENTION

A composition for electrocoating a paint film onto an anode electrically conductive substrate is primarily based upon a binder polymer composition comprising on a weight basis:
(a) 20% to 40% styrene-allyl alcohol copolymer;
(b) 20% to 50% fatty acid esterified with a portion of the hydroxyl groups on (a);
(c) 0% to 3.0% α,β-unsaturated dicarboxylic acid or anhydride esterified with a portion of the allyl alcohol groups on (a); and
(d) 20% to 50% acid-functional acrylic copolymer having double bonds coreacted with the fatty acid and unsaturated acid modified styrene-allyl alcohol polymer formed in (a), (b), and (c).

DETAILED DESCRIPTION OF THE INVENTION

The electrocoating composition of this invention is primarily based on a polymer comprising coreaction between (a) styrene-allyl alcohol copolymer, (b) fatty acid, (c) α,β-unsaturated dicarboxylic acid or anhydride, and (d) acid-functional acrylic copolymer.

(a) Referring first to the styrene-allyl alcohol copolymer, the copolymer can contain by weight between about 2.8 and 4.3 parts styrene copolymerized with one part allyl alcohols having the general structural formula of:

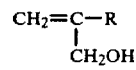

wherein R is an aliphatic chain containing 1 to 9 carbon atoms. Examples of suitable allyl alcohols are allyl alcohol and methallyl alcohol. Styrene and allyl alcohols are coreacted together to provide a styrene-allyl alcohol copolymer having the general structural formula of

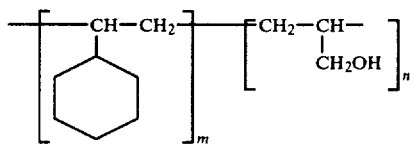

wherein m=8 through 13 inclusive and n=5 through 6 inclusive. The equivalent hydroxyl weight of the copolymer is between about 197 and 328, and the molecular weight of the copolymer is between about 1120 and 1700.

(b) Referring now to the fatty acid modification of the styrene-allyl copolymer, between about 0.5 and 1.3 weight parts of unsaturated aliphatic fatty acid are esterified with one weight part of the styrene-allyl copolymer by esterification with part of the available hydroxyl groups on the styrene-allyl alcohol copolymer (a). In the resulting fatty acid modified styrene-allyl copolymer, suitable aliphatic fatty acids contain between about 8 and 20 carbon atoms and include for example, oleic, linoleic, linolenic acids and mixtures thereof. The fatty acid can be esterified with the hydroxyl containing styrene-allyl copolymer at temperatures of about 350°-500° F. (180°-260° C.) to produce a structural copolymer generally illustrated as follows.

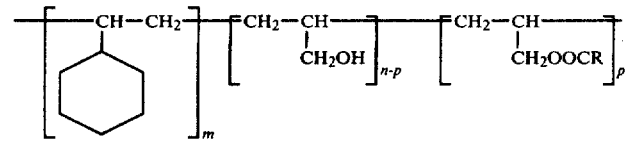

wherein:
m=8 to 13 moles of styrene,
n=5 to 6 moles of allyl alcohol, and
p=moles of fatty acid wherein R is the aliphatic fatty chain.

The resulting fatty acid modified styrene-allyl copolymer can have an hydroxyl number between 0 and 90 and a molecular weight between about 1600 and about 3000. The unreacted hydroxyl groups can be further reacted with an α,β-unsaturated acid anhydride as hereinafter described.

(c) Referring next to the α,β-unsaturated dicarboxylic acid modification of the styrene-allyl copolymer, between about 0 and about 6.0 weight parts of α,β-unsaturated dicarboxylic acid or anhydride is esterified with the remaining available hydroxyl groups on 100 parts by weight of the fatty acid modified styrene-allyl copolymer. Useful α,β-unsaturated carboxylic acid anhydrides include for example, maleic anhydride, and/or itaconic anhydride and the like. The resulting polymer has the following structural formula:

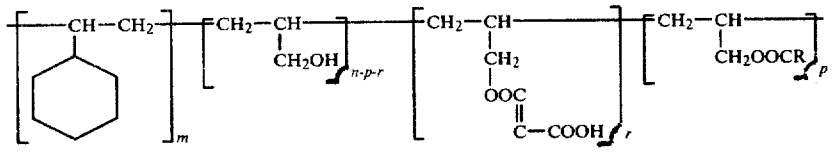

wherein:
- m = 8 to 13 moles of styrene
- n = 5 to 6 moles allyl alcohol
- p = moles of unsaturated fatty acid
- r = moles of α,β-unsaturated dicarboxylic acid The resulting fatty acid and α,β-unsaturated acid modified styrene-allyl copolymer has a molecular weight between about 1600 and about 3000.

(d) Referring next to the acid-functional acrylic copolymer, said acrylic copolymer comprises acrylic monomer copolymerized with styrene or vinyl toluene and acrylic or methacrylic acid. On a weight basis, the acid-functional acrylic copolymer contains polymerized monomer of between about 0% and 60% acrylic monomer, 30% and 90% styrene or vinyl toluene and 10% and 50% acrylic or methacrylic acid. Acrylic monomers include for example, lower alkyl esters of acrylic or methacrylic acid such as ethyl acrylate, propyl acrylate, butyl acrylate, methyl methacrylate, and ethyl methacrylate. The acid-functional acrylic polymer is copolymerized in presence of peroxide initiator with the copolymer (a)-(b)-(c) formed hereinabove by reacting the acid-functional acrylic monomer mixture (d) with the maleic unsaturation in copolymer (a)-(b)-(c) and/or by reacting with active methylene group alpha to a fatty acid double bond.

The foregoing electrocoating composition comprises by weight:
(a) 20% to 40% styrene-allyl alcohol copolymer;
(b) 20% to 50% fatty acid esterified with a portion of the hydroxol groups in (a);
(c) 0% to 3% α,β-unsaturated dicarboxylic acid esterified with a portion of the hydroxyl groups on (a); and
(d) 20% to 50% acid-functional acrylic copolymer having double bond coreacted with the double bonds of copolymer of (a)-(b)-(c).

Stable aqueous dispersions are obtained by neutralization of both the α,β-unsaturated dicarboxylic acid ester acidity and the methacrylic acid carboxyls using alkali-metal hydroxides or amines. At least about 1% by weight of alkali-metal hydroxide or amine is coreacted with the electrocoating polymer (a)-(b)-(c)-(d) to neutralize carboxyl groups pendant and attached to the polymer backbone. Useful amines are selected from aliphatic, aromatic, and alkanolamines generally indicated $-NH_2$, $=NH$, $\equiv N$, $-N-(ROH)_2$, $=N-(ROH)$, and $N-(ROH)_3$. Useful solubilizing bases are bases such as NaOH and KOH. Neutralization of the polymer is based on the actual measurable acid value of the polymer. The acid number of the polymer should be at least about 20 and preferably between about 40 and 80. Among the amines that can be used are those amines which form water dispersible salts with the polymers and have a carbon content of less than about 10 carbon atoms per amine molecule. Suitable amines include, for example, diethyl amine, triethyl amine, monoisopropanol amine, monoethanol amine, diethanol amine as well as ammonia and aqueous ammonia commonly called ammonium hydroxide, and other amines as set forth in the examples. Useful amines are disclosed in U.S. Pat. No. 3,759,807, and the same are incorporated herein by reference. The preferred amines are diisopropanol amine, dimethylethanolamine, methyldiethanol amine, diethylethanol amine, triethanolamine. Preferably just enough base or amine is added to form a water dispersible salt of the polymer, and preferably between about 1 and 30% by weight base or amine is added based on the polymer. For example, polymers having an acid value of about 40 to 60 require about 0.7 to 1.0 equivalents of amine for each equivalent of acid found in the polymer, although polymers having an acid value greater than 100 can require as little as 0.3 equivalent of amine per each equivalent of acid.

Solubilization of the polymers can be effected by reacting the carboxyl groups on said polymer with the required amount of amine, and then adding water to the amine salt of the polymer. The resulting mixture thereof can be agitated to form a stable water dispersion. A preferred method of solubilizing the polymers is to add slightly warmed polymer to a water amine solution and agitate and warm the solution, if necessary, until a good dispersion compatible in water is obtained. The solids content of such aqueous solution of solubilized polymer is generally about 5 to 25 weight percent, and preferably about 5 to 15 weight percent.

The water solutions of polymer can be applied to a substrate in a conventional manner but is particularly suitable for electrocoating onto a conductive metal anode which is the object to be coated with a paint film. The anode substrate is an electrically conductive metal such as iron, steel, aluminum, galvanized steel, zinc, and the like. The coating composition can be electrocoated onto the anode workpiece by passing a direct electric current between the anode and the cathode of the electrocoating bath to deposit a coating composition on the anode.

The method of electrocoating is carried out at a voltage above the threshold voltage of the electrocoating paint composition being electrocoated onto the anode workpiece. The threshold voltage is the voltage at which deposition of the solubilized binder composition is initiated upon the workpiece when a direct electric current is passed through the electrocoating bath between the workpiece and a second electrode referred to as a cathode. The cathode is electrically negative in relation to the workpiece and spaced therefrom wherein both the cathode and the anode electric workpiece is in electrical contact with the electrocoating bath. The maximum tolerable voltage is slightly below the rupture voltage of the paint coating being applied to the substrate. The rupture voltage is commonly understood to be that voltage at which a paint film already applied to the substrate ruptures upon continued application of such voltage across the terminals during the immersion of the workpiece within the electrocoating bath. The minimum desirable voltage should range between about 20 and about 500 volts, and preferably between about 50 and 300 volts. The temperature of the electrocoating bath normally is between about 15° and about 50° C. Preferably the temperature for electrodeposition is between about 20° and about 35° C. and maintenance of the bath temperature between this temperature range is preferred. Electrocoating bath agitation is desirable to maintain uniformity of composition as well as uniform temperatures at the anode surfaces.

The electrocoating bath can be replenished continuously or incrementally with a replenishing composition so as to maintain the electrocoating bath approximately at a pre-determined composition wherein the total replenishment is substantially equal over a sustained operating period. The replenished composition can be concentrated having a higher level of solids to water content as suggested in U.S. Pat. No. 3,575,909.

The merits of the electrocoating composition of this invention are further illustrated by the following examples.

EXAMPLE 1

Into a suitable reaction vessel equipped with stirrer, thermometer, dean-stark water-trap, condenser and nitrogen inlet tube there are charged 2398 grams of a styrene-allyl alcohol copolymer of molecular weight 1100 and hydroxy equivalent wt. 220, and 2398 grams of a mixed fatty acid containing predominantly linoleic acid. This ester was processed along with xylol (191 grams) as a water removal assist during resin esterification at a maximum reactor temperature of 240° C. and to an acid no. of 4-5 mg. KOH per gram. This "base ester" was cooled to 140° C. Then 69 grams of maleic anhydride was added and reacted in at 140°-145° C. for 15 minutes. To this maleinized ester, 1763 grams of solvent ethylene glycol mono butyl ether (EGMBE) was added and a temperature of 140°-145° C. was regained. A monomer premix comprising the following:

| Styrene | 1794 grams |
| Methacrylic acid | 453 grams |
| Ditertiary butyl peroxide | 90 grams | was then added dropwise to the reaction mixture at 140°-145° C. over a period of 4 hours. The batch was held at 140°-145° C. for 4 hours at which time the polymerization was substantially complete as indicated by a non-volatile content of at least 79% and a free styrene content less than 0.6%. To the batch was then added 70 grams Ionol, an antioxidant tank stabilizer, and 70 grams of a solution of cobalt napthenate containing 6% cobalt, a curing accelerator, and 512 grams of a mineral spirits, boiling range 150°-200° C. The purpose of the mineral spirits was to assist post-flow of the coating and to improve electrical resistance of the deposited film to allow higher application voltages. Final constants on the resin were as follows:

| Non-volatile | 73.0% |
| Viscosity (reduced to 50% NV in EGMBE) | H-L (Gardner Scales) |
| Acid No. of non-volatile | 46 |

EXAMPLE 2

Into a reaction vessel equipped as in Example 1, there were charged 2138 grams styrene-allyl alcohol copolymer (Ex. 1), 2138 grams mixed linoleic fatty acid (Ex. 1), and 171 grams xylol. This base ester was processed exactly as in Example 1. The base ester was maleinized by reacting with 61 grams of maleic anhydride at 140°-145° C. for 15 minutes. The ester was then cut with 1769 grams solvent EGMBE and 705 grams mineral spirits having a boiling range of 150°-200° C. To this solution was added at reflux (155° C.) the following monomer premix:

| Styrene | 2262 grams |
| Methacrylic acid | 504 grams |
| Ditertiary butyl peroxide | 110 grams | over a period of 4 hours. The batch was held for 4 hours at 145°-150° C. at which time the polymerization was substantially complete as indicated by a non-volatile content of at least 72%. To the batch was then added 70 grams 6% cobalt solution and 70 grams Ionol. Final constants of the batch were:

| Non-volatile | 73.0% |
| Viscosity (50% NV in EGMBE) | I-M (Gardner Scale) |
| Acid No. (on solids) | 48 |

EXAMPLE 3

A base ester was prepared exactly as in Example 1 from 2619 grams styrene-alcohol copolymer (Ex. 1), and 2619 grams mixed linoleic fatty acid (Ex. 1), and 209 grams toluene; the toluene was removed by a vacuum distillation. The base ester was then maleinized with 75 grams maleic anhydride by reacting at 140°-145° C. for 15 minutes. 1926 grams EGMBE was added and the following monomer premix grafted onto this maleinized base ester solution:

| Styrene | 1959 grams |
| Methacrylic acid | 495 grams |
| Ditertiary butyl peroxide | 98 grams | by adding it dropwise over a 4-hour period at 160° C. falling to 145° C. The batch was then held for 4 hours at 145° C. Final batch constants were:

| Non-volatile | 80% |
| Viscosity (at 50% NV in EGMBE) | L-P (Gardner Scale) |
| Acid No. (on solids) | 46 |

EXAMPLE 4

The base ester prepared as in Example 1, using 2468 grams styrene-alcohol copolymer (Ex. 1), 2468 grams mixed linoleic fatty acid (Ex. 1), and 198 grams toluene. Toluene was removed by vacuum distillation. The base ester was maleinized at 140°-145° C. for a period of 15 minutes with 157 grams of maleic anhydride. To this was then added 2412 grams EGMBE as solvent. To this base ester solution was then added at 140°-145° C. over a period of 4 hours the following monomer premix:

| | |
|---|---|
| Styrene | 1291 grams |
| Methyl Methacrylate | 556 grams |
| Methacrylic acid | 384 grams |
| Dicumyl peroxide | 67 grams |

The polymerization was substantially completed within a 4-hour hold period at 140°–145° C. Final constants were as follows:

| | |
|---|---|
| Non-volatile | 74.6% |
| Viscosity (50% NV in EGMBE) | I-J (Gardner Scale) |
| Acid No. (on solids) | 45.5 |

PAINT EXAMPLES

EXAMPLE 5

A black pigmented electrocoat tank composition was prepared from Example 1 resin in the following parts by weight:

| | |
|---|---|
| Example 1 Resin | 109.6 |
| Di-isopropanolamine (85%) | 13.3 |
| Non-ionic surface active agent | 0.1 |
| Hydrated aluminum silicate | 16.0 |
| Furnace black | 4.0 |
| Deionized water | 857.0 |

This electrocoat paint has a non-volatile content of 10%, a pigment to binder ratio of ¼, and a pH of 9.5 to 10.0. By applying a coating voltage of 100–150 V, a film thickness of 0.3 to 0.5 mils is obtained. The coating was able to withstand a voltage of greater than 250 V before rupture occurred. The coated part, upon being removed from the tank and water rinsed, was dry enough to be handled and stacked within 20 minutes when exposed to forced air circulation at a temperature of 20°–25° C. A tough coating developed on over-night dry.

EXAMPLE 6

A black pigmented electrocoat tank composition was prepared from the resin of Example 2 in the following parts by weight:

| | |
|---|---|
| Example 2 Resin | 164.3 |
| Potassium Hydroxide (85%) | 6.5 |
| Non-ionic surface active agent | 0.2 |
| Hydrated aluminum silicate | 18.0 |
| Furnace black | 12.0 |
| Deionized water | 799.4 |

This paint has a non-volatile content of 15%, a pigment to binder ratio of ¼ and a pH of 9.8–10.2. A film thickness of 0.2–0.3 mils was obtained by applying a voltage of 80–100 V although the coating will withstand greater than 250 V before film rupture occurs. The rinsed coated part was dry enough to be handled and stacked within 20 minutes of forced-air drying at 20°–25° C. A tough coating was the result of an overnight dry. No deterioration in coating application or performance was observed by constant vigorous agitation of the electrocoat solution using a Teal pump for a period of 3 weeks.

EXAMPLE 7

A buff-colored electrocoat tank composition was prepared from the resin of Example 3 in the following parts by weight:

| | |
|---|---|
| Example 3 Resin | 99.9 |
| Ionol (2-6 ditertiary butyl 4-methyl phenol) | 0.3 |
| Cobalt napthenate (6% cobalt) | 5.3 |
| Pine oil | 7.0 |
| Non-ionic surface active agent | 1.6 |
| Resinous organo-phosphate | 0.3 |
| Di-isopropanolamine (85%) | 11.3 |
| Dimethylethanolamine | 0.7 |
| Hydrated aluminum silicate | 5.6 |
| Strontium chromate | 0.3 |
| Yellow Iron Oxide | 1.1 |
| Rutile Titanium Dioxide | 13.0 |
| Phthalocyanine Green | 0.04 |
| Deionized water | 851.5 |
| Ethylene glycolmono-butyl ether | 2.0 |

This paint has a non-volatile content of 10%, a pigment to binder ratio of ¼ and a pH of 9.3–9.7. The coating was applied at a film thickness of 0.8–1.0 mils by an applied voltage of 175 V although it will withstand 200 V before film rupture occurs. The coating applied on phosphate-treated steel panels (EP-10) and force-dried at 82° C. for 20 minutes exhibited excellent gloss and postflow properties. After 1 week at ambient temperature, the coating had a pencil hardness of 2B and withstood 240 hours of a 5% salt-fog test.

The deposited resin is very hydrophobic which provides excellent plating properties such as shut-down and throwing power. The cured films exhibit excellent water and salt spray resistance. The electrocoating polymer (a)-(b)-(c)-(d) composition of this invention is substantially free of readily hydrolyzable ester groups which provide good resistance properties and electrocoating bath stability. The electrocoated resin Tg can be advantageously adjusted to provide good handling properties such as good post-flow, dry-to-handle, or dry-to-stack properties. The polymer (a)-(b)-(c)-(d) contains sufficient residual unsaturation in the fatty acid chains whereby an air oxidation cure or a heat cure can be obtained with a cobalt napthenate or other conventional dryer salt.

The foregoing examples of the electrocoating composition are not intended to be limiting except as defined by the appended claims.

I claim:

1. An anodic aqueous electrocoating process for electrocoating a paint film onto an electrically conductive metal anode substrate, the improvement providing a binder polymer composition comprising on a weight basis on a step-wise basis:
   (a) providing 20% to 40% of a styrene-allyl alcohol copolymer containing unreacted hydroxyl groups;
   (b) esterifying 20% to 50% of a fatty acid with a portion of the hydroxyl groups on copolymer (a);
   (c) esterifying 0% to 3% of α,β-unsaturated dicarboxylic acid or anhydride with a portion of the hydroxyl groups on copolymer (a); and
   (d) coreacting 20% to 50% of an acid-functional acrylic copolymer by addition polymerization with the fatty acid (b) and the dicarboxylic acid or anhydride (c), and neutralizing said acid-functional groups and dispersing said binder polymer composition in water to provide an aqueous anodic electrocoating composition.

* * * * *